(12) United States Patent
Kielwein et al.

(10) Patent No.: US 9,919,676 B2
(45) Date of Patent: Mar. 20, 2018

(54) BELT RETRACTOR

(71) Applicant: TRW Automotive GmbH, Alfdorf (DE)

(72) Inventors: Thomas Kielwein, Eschach (DE); Frederic Michel, Schwäbisch Gmund (DE)

(73) Assignee: TRW Automotive GmbH (DE)

( * ) Notice: Subject to any disclaimer, the term of this patent is extended or adjusted under 35 U.S.C. 154(b) by 136 days.

(21) Appl. No.: 14/773,414

(22) PCT Filed: Mar. 10, 2014

(86) PCT No.: PCT/EP2014/000607
§ 371 (c)(1),
(2) Date: Sep. 8, 2015

(87) PCT Pub. No.: WO2014/139658
PCT Pub. Date: Sep. 18, 2014

(65) Prior Publication Data
US 2016/0016535 A1   Jan. 21, 2016

(30) Foreign Application Priority Data
Mar. 12, 2013  (DE) .................. 10 2013 004 211

(51) Int. Cl.
*B60R 22/36* (2006.01)
*B60R 22/34* (2006.01)
*B60R 22/40* (2006.01)

(52) U.S. Cl.
CPC ............ *B60R 22/36* (2013.01); *B60R 22/34* (2013.01); *B60R 22/3413* (2013.01); *B60R 22/40* (2013.01); *B60R 2022/3402* (2013.01)

(58) Field of Classification Search
CPC ......... B60R 22/34; B60R 22/36; B60R 22/40; B60R 22/3413
See application file for complete search history.

(56) References Cited

U.S. PATENT DOCUMENTS 4,422,594 A * 12/1983 Honl ...................... B60R 22/405
                                                         242/383.4
5,333,906 A *  8/1994 Fujimura ................ B60R 22/44
                                                         242/382.6
(Continued)

FOREIGN PATENT DOCUMENTS

EP       1055568      11/2000
EP       1394004       3/2004
(Continued)

*Primary Examiner* — Sang K Kim
(74) *Attorney, Agent, or Firm* — Tarolli, Sundheim, Covell & Tummino LLP

(57) ABSTRACT

On a belt retractor (10) for a vehicle seat belt comprising a frame (12) provided with plural locking teeth (24), a belt reel (14) which is rotatably supported in the frame (12) and includes a locking tooth system (26) corresponding to the locking teeth (24), and comprising a locking mechanism adapted to transfer the belt reel (14) from a home position in which it is freely rotatable into a locking position in which the locking tooth system (26) of the belt reel (14) engages in the locking teeth (24) of the frame (12), wherein at least one pivoting control lever (28) is provided in which one side of the belt reel (14) is rotatably supported and which is adapted to guide the belt reel (14) from the home position into the locking position, an interlock mechanism is provided which releases the pivoting movement of the control lever (28) not before the latter has been rotated in the unwinding direction (A) of the webbing out of a home position into a release position.

11 Claims, 5 Drawing Sheets

(56) References Cited

U.S. PATENT DOCUMENTS

| | | |
|---|---|---|
| 6,364,238 B1 | 4/2002 | Weller |
| 2013/0181430 A1 | 7/2013 | Bosse et al. |
| 2014/0091167 A1* | 4/2014 | Rink ................. B60R 22/40 |
| | | 242/384.2 |

FOREIGN PATENT DOCUMENTS

| | | |
|---|---|---|
| WO | 2012041443 | 4/2012 |
| WO | 2012156074 | 11/2012 |

\* cited by examiner

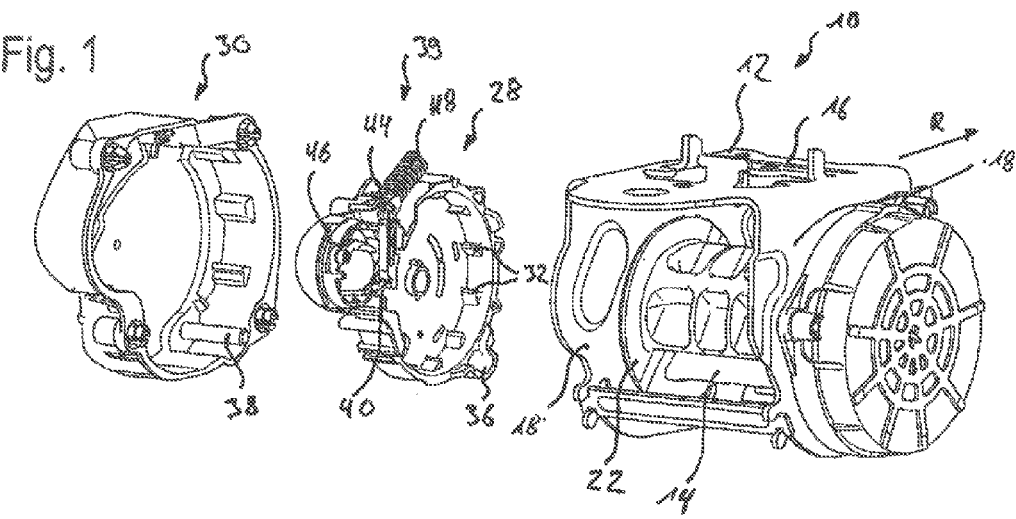
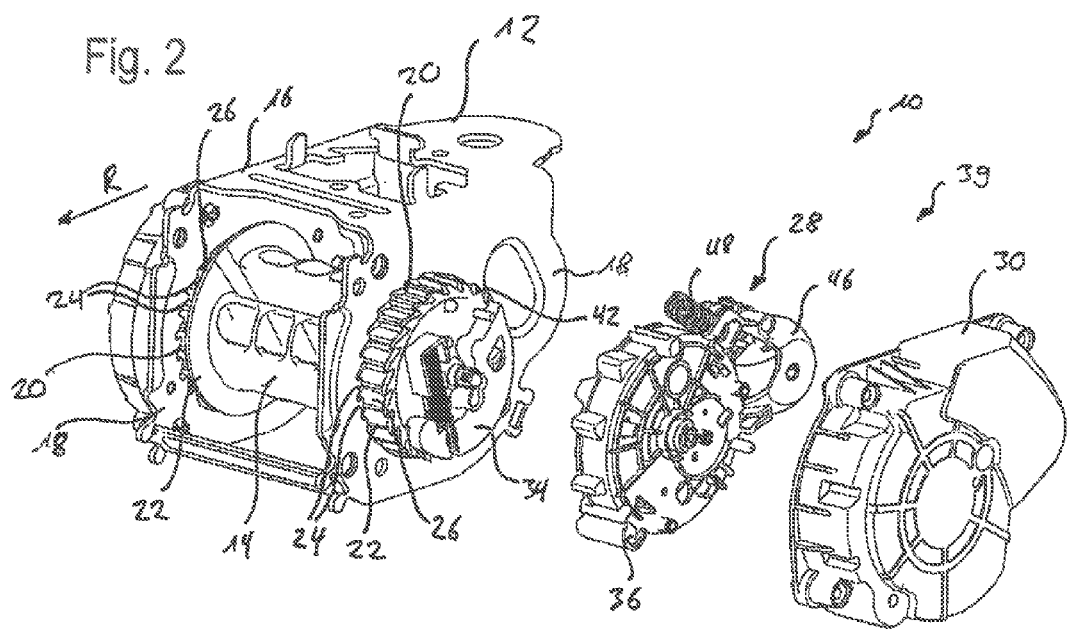

BELT RETRACTOR

RELATED APPLICATIONS

This application corresponds to PCT/EP2014/000607, filed Mar. 10, 2014, which claims the benefit of German Application No. 10 2013 004 211.9, filed Mar. 12, 2013, the subject matter, of which are incorporated herein by reference their entirety.

BACKGROUND OF THE INVENTION

The invention relates to a belt retractor for a vehicle seat belt rising a frame provided with plural locking teeth, a belt reel rotatably supported in the frame and a locking tooth system corresponding to the locking teeth and comprising a locking mechanism with is adapted to transfer the belt reel from a home position in which it is freely rotatable into a locking position in which the locking tooth system of the belt reel engages in the locking teeth of the frame, wherein at least one pivoting control lever is provided in which one side of the belt reel is rotatably supported and which is adapted to guide the belt real from the home position into the locking position.

A belt retractor of this type makes use of a displacement of the belt reel (more exactly speaking at least one side of the belt reel) for locking the belt red. The displacement results in the locking tooth system of the belt reel being guided into the locking teeth of the frame. This prevents the belt reel from rotating in the take-off direction of the belt webbing. The rotation against a high resistance moment which is nevertheless possible due to a possibly provided force limiter is left aside in this context.

The locking mechanism is in charge of ensuring that the locking tooth system engages in the locking teeth in the correct position. The locking mechanism causes pre-locking of the belt reel in the control lever at predetermined angular positions of the locking tooth system which is adjusted to the position of the locking teeth. The way in which the locking mechanism brings about said pre-locking (i.e. prevention of rotation relative to the control lever) is known per se. What is important is that the pre-locking requires rotation of the belt reel in the unwinding direction, until the belt reel is pre-locked either due to a vehicle-sensitive blocking or a webbing-sensitive blocking. When in the pre-locked state a tensile force is exerted on the webbing, said tensile force causes the belt reel guided by the control lever to be pulled toward the locking teeth and to finally engage in the latter.

It is a drawback of such belt retractor that the control lever can guide the belt reel to the locking teeth even if the belt reel is not pre-locked and no tensile force acts on the webbing, either. This can happen especially when high acceleration (or deceleration) acts on the belt retractor, thus resulting in displacement of the control lever together with the belt reel. Any deceleration required for this purpose, however, is so high due to a usually provided reset spring that in most cases it is only reached in the case of crash. Therefore, it would basically be considered to be positive to have the belt reel engage in the locking teeth already at an early point in time. However, this type of engagement of the locking tooth system in the kicking teeth does not ensure that a positional correct engagement is brought about. It cannot be excluded that tooth crests abut on tooth crests, which in the case of a subsequent load might result in the fact that the locking tooth system does not engage in the locking teeth at all.

SUMMARY OF THE INVENTION

It is the object of the invention to further develop a belt retractor of the type mentioned in the beginning to the effect that reliable locking of the belt reel is ensured under all operating conditions.

For achieving the object, in a belt retractor of the type mentioned in the beginning there is provided an interlock mechanism which releases the pivoting movement of the control lever only after the latter has been rotated from the home position into a release position in the unwinding direction of the webbing. The belt retractor according to the invention is based on the fundamental idea to release the pivoting movement of the control lever only when the belt reel has been rotated about a particular minimum angle in the unwinding direction, i.e. about an angle of rotation leading to the correct orientation and pre-locking of the belt reel at the control lever. Unless said angle of rotation is passed, the control lever cannot be pivoted into the locking position, either. This prevents the belt reel from being moved into the direction of the locking teeth in any random position. The pre-locking can be effectuated especially by means of the usual locking mechanisms for vehicle-sensitive and for webbing-sensitive blocking.

The latching mechanism may include frame-side supporting faces, for example, to which the control lever is adjacent in the home position. The supporting faces are arranged so that in the home position the control lever is adjacent thereto and in the case of a take-off force acting on the webbing is pressed against the former. A movement into the locking position in which the tooth system engages in the locking teeth is thus prevented by the supporting faces. The supporting faces are configured so that the control lever, when rotated into the release position, is no longer adjacent to the supporting faces and thus can be displaced from the release position into the locking position.

The supporting faces are arranged at an angular distance from each other with respect to the axis of rotation of the belt reel and, resp., of the control lever. The supporting faces are preferably arranged to be distributed so that in the case of a tensile force in the take-off direction of the belt the control lever is evenly adjacent thereto and cannot be swiveled. in addition, the supporting faces provide a bearing which permits easy rotation of the control lever into the release position, when the belt reel is coupled to the control lever and the belt reel is rotated.

The interlock mechanism may also include supporting faces on the control lever side. They can interact, for example, in the home position with the frame-side supporting faces so that displacement of the belt reef and, resp., of the control lever into the locking position is not possible. In the release position the supporting faces on the control lever side and on the frame side do not contact each other so that displacement of the control lever and, resp., of the belt reel into the locking position is possible.

The supporting faces on the control lever side can equally be arranged at an angular distance from each other, the angular distance of the control lever-side supporting faces preferably corresponding to the angular distance of the frame-side supporting faces so that they can be adjacent to each other in the home position.

The supporting faces can have sliding faces extending inclined with respect to the circumferential direction, for example. They can be configured so that the corresponding frame-side or control lever-side supporting faces pass onto the sliding faces already when the control lever is slightly displaced. In such configuration the sliding faces are orientated such that the control lever is guided along the same so that the control lever is moved into the release position or into the locking position in which the tooth system of the belt reel can engage in the locking teeth of the frame. Hence the sliding faces have the function of guide elements which additionally guide the control lever during the pivoting operation so that a jerky movement of the control lever from the release position into the locking position is avoided.

The control lever is movably supported vis-à-vis the frame. This is preferably carried out via a bearing by means of which the control lever is arranged on the frame side. The bearings configured so that the control lever can be rotated from the home position into the release position, the pivot point preferably corresponding to the pivot point of the belt reel at the control lever, and can be swiveled from the release position into the locking position.

The bearing may consist, for example, of a slotted hole and a pivot pin engaging in the slotted hole, wherein the direction of movement from the home position into the release position is determined by the slotted hole. The slotted hole thus preferably extends in the unwinding direction having a constant radius about the pivot point of the belt reel at the control lever. When the control lever is provided in the release position, the control lever can subsequently be pivoted about the pivot pin into the locking position.

The pivot pin can be provided at a bearing shell, for example, which is arranged on the frame.

In this embodiment, the slotted hole is preferably provided at the control lever.

BRIEF DESCRIPTION OF THE DRAWINGS

Further advantages and features are evident from the following description in connection with the enclosed drawings, in which:

FIG. 1 shows an exploded view of a belt retractor according to the invention,

FIG. 2 shows a second exploded view of the belt retractor from FIG. 1,

FIGS. 5a and 5b are side views of the belt retractor from FIG. 1 with the control lever being in a home position, wherein FIG. 5a shows the vehicle-sensitive blocking mechanism and FIG. 5b merely shows the control lever being arranged in a housing shell.

DESCRIPTION

Figure 3:
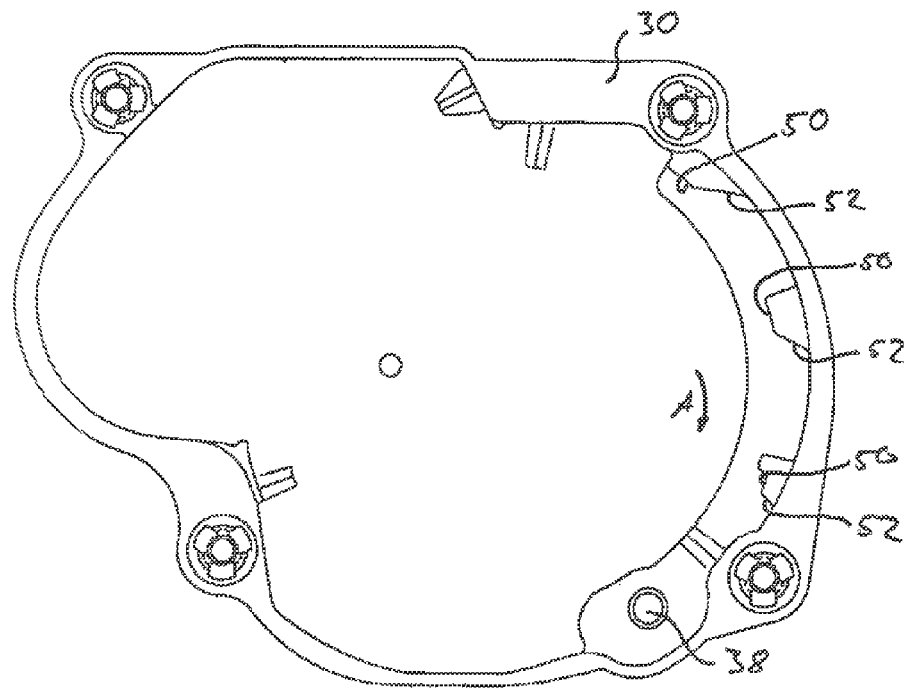
FIG. 3 shows a housing shell of the belt retractor from FIG. 1.

FIGS. 1 end 2 illustrate a belt retractor 10 including a frame 12 and a belt reel 14 which is rotatably supported in the frame 12. The frame has a rear part 16 and two side parts 18, each of the two side parts 18 including an aperture 20 in each of which a flange 22 of the belt reel 14 is accommodated.

The rim of at least one aperture 20 is provided with plural locking teeth 24 the geometry and pitch of which is adjusted to a locking tooth system 26 formed at the corresponding flange 22 of the belt reel 14.

A control lever 26 which is cap-shaped and which is supported to be movable to a limited extent on a bearing shell 30 fixed to the frame which encloses the control lever 28 is provided at one of the two side parts 18 of the belt retractor 10.

Figure 4:
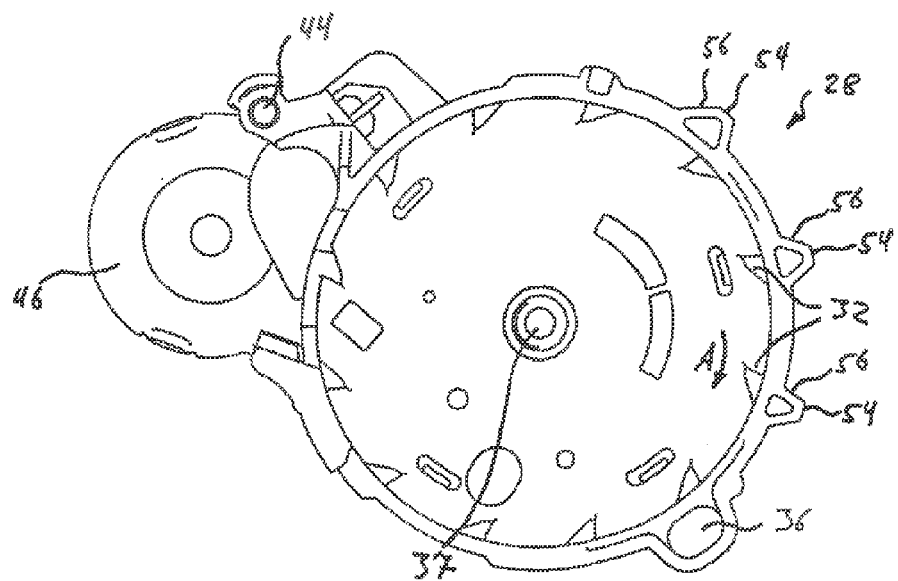
FIG. 4 shows a control lever of the belt retractor from FIG. 1.

As is evident from FIG. 4, a slotted hole 36 through which the control lever 28 is movably supported on a pivot pin 38 at the bearing shell 30 is provided at the control lever 28. The slotted hole 36 extends with constant radius around the pivot point 37 of the belt reel 14 on the control lever 28.

The control lever 28 can be rotated by the bearing formed of the slotted hole 36 and the pivot pin 38 about the pivot point 37 of the belt reel 14, on the one hand. On the other hand, it is possible to pivot the control lever about the pivot pin 38.

On an inner surface of a peripheral wall the control lever 26 is provided with an internal tooth system 32 which is part of a webbing-sensitive locking mechanism. The latter includes a control pawl 34 arranged on the belt reel 14 which can be driven into the internal toothing 32 upon acceleration of the belt reel 14 due to rapid webbing extension, thereby the belt reel 14 being coupled to the control lever 28 and the belt reel 14 being prevented from further rotating in the direction of webbing extension. By virtue of the arrangement of the teeth of the internal toothing 32, the belt reel is pre-locked at particular angular positions which are adjusted to the arrangement of the locking teeth 24.

The belt retractor 10 further includes a vehicle-sensitive locking mechanism 39. The locking mechanism 39 includes an intermediate lever 40 which is pivoted on the control lever 28 by a bearing pin 44 and is adapted to engage in a control toothing 42 at the belt reel 14. In order to swivel the intermediate lever 40 into the control toothing 42 a sensor 46 responsive in a vehicle-sensitive manner is provided. The structure of such sensor 46 is known per se and therefore will not be explained in detail.

Figure 5A:
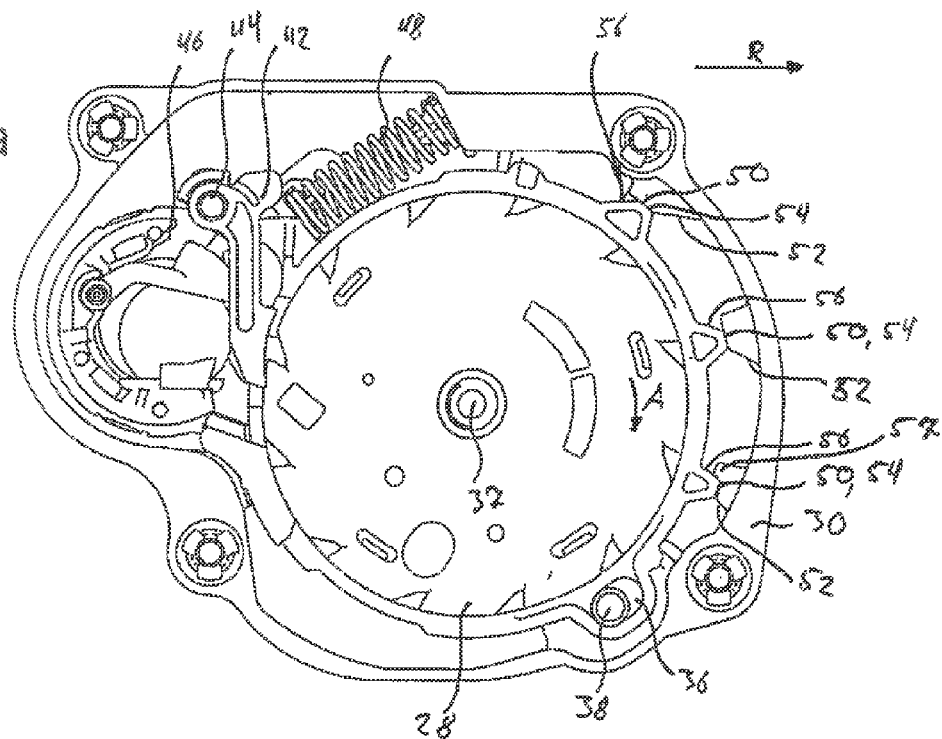
Figure 5B:
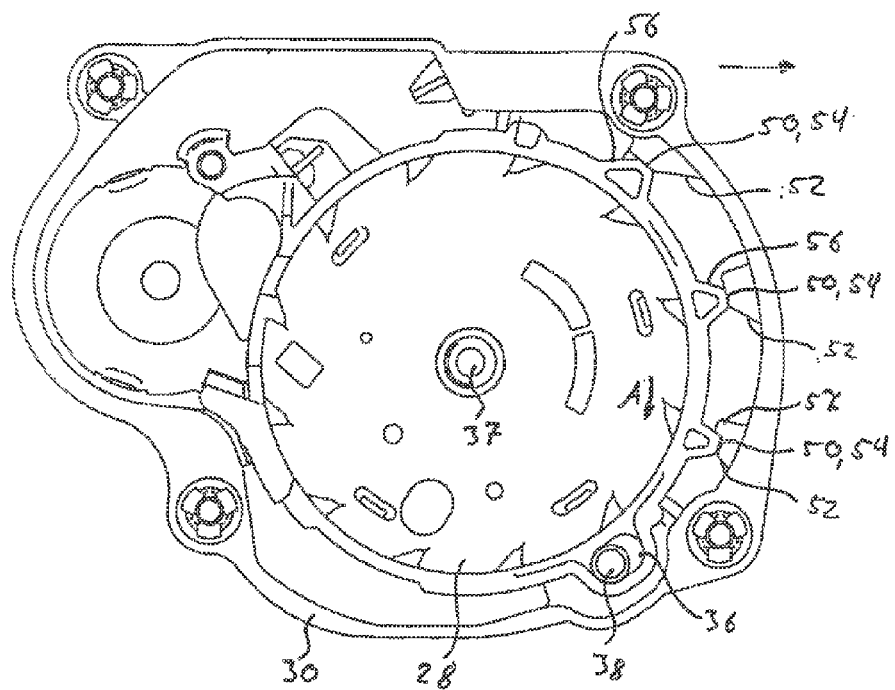

Between the bearing shell 30 and the control lever 28 a spring 48 is provided for urging the control lever 28 into the home position shown in FIGS. 5a and 5b in which the locking tooth system 26 of the belt reel is not engaged in the locking teeth 24. The belt reel is provided in the home position in which it can be freely rotated.

When the vehicle-sensitive or the webbing-sensitive locking mechanism is activated, the belt reel is pre-locked relative to the control lever. When then tensile force is exerted on the webbing in the take-off direction R, the belt reel, being guided by the control lever, is brought into the locking position in which its locking tooth system engages in the locking teeth at the frame.

In the previously known belt retractors the control lever 28 and the belt reel 14 are moved by said tensile force directly into a locking position and, resp., are swiveled about the pivot pin 38 into the locking position in which the locking tooth system 26 of the belt reel 14 engages in the locking teeth 24 of the frame 12.

In order to prevent the control lever and the belt reel from being swiveled out of the home position into the locking position without the belt reel having been pre-locked in the correct position on the control lever by tension at the webbing, an interlock mechanism is provided which in the home position of the control lever prevents direct shifting or swiveling into the locking position and will permit the latter only when the control lever has been rotated from the home position (FIGS. 5a and 5b) into a release position (FIGS. 6a and 6b) in an unwinding direction A of the webbing.

In the embodiment illustrated here the interlock mechanism includes three frame-side supporting faces 50 provided on the inside of the bearing shell 30. A sliding face 52 which is directly connected to the supporting face 50 in the unwinding direction A is provided at each of the supporting faces 50. The sliding faces extend outwardly inclined in the unwinding direction A, wherein the sliding faces 52 are arranged substantially perpendicularly to a radius about the pivot pin 38.

At the control lever 28 furthermore supporting faces 54 on the control lever side are provided each of which equally has a sliding face 56 provided in the unwinding direction A ahead of the respective supporting face 54 and is arranged equally substantially perpendicularly to the radius about the pivot pin 38.

In the home position shown in FIGS. 5*a* and 5*b*, the frame-side supporting faces 50 and the control lever-side supporting faces 54 are adjacent to one another in the take-off direction R of the webbing so that displacement of the belt reel 14 toward the locking teeth 24 of the frame 12 is not possible. Thus inadvertent driving of the locking tooth system 26 into the locking teeth 24 is excluded.

The control lever 28 is prevented from rotating against the unwinding direction A on the one hand by the slotted hole 36 and the pivot pin 38, reap. On the other hand, a radial projection 57 preventing rotation against the unwinding direction A is provided at one of the frame-side contact faces 50.

Figure 6A:
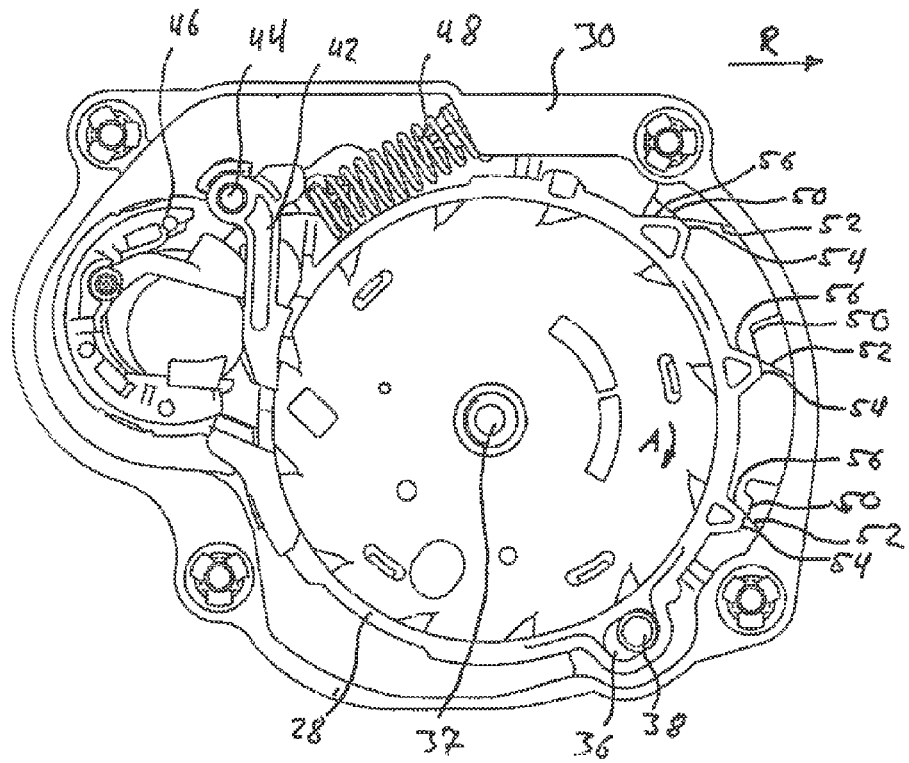
FIGS. 6a and 6b show the same views as in FIGS. 5a and 5b, wherein the control lever is provided in an intermediate position.
Figure 6B:
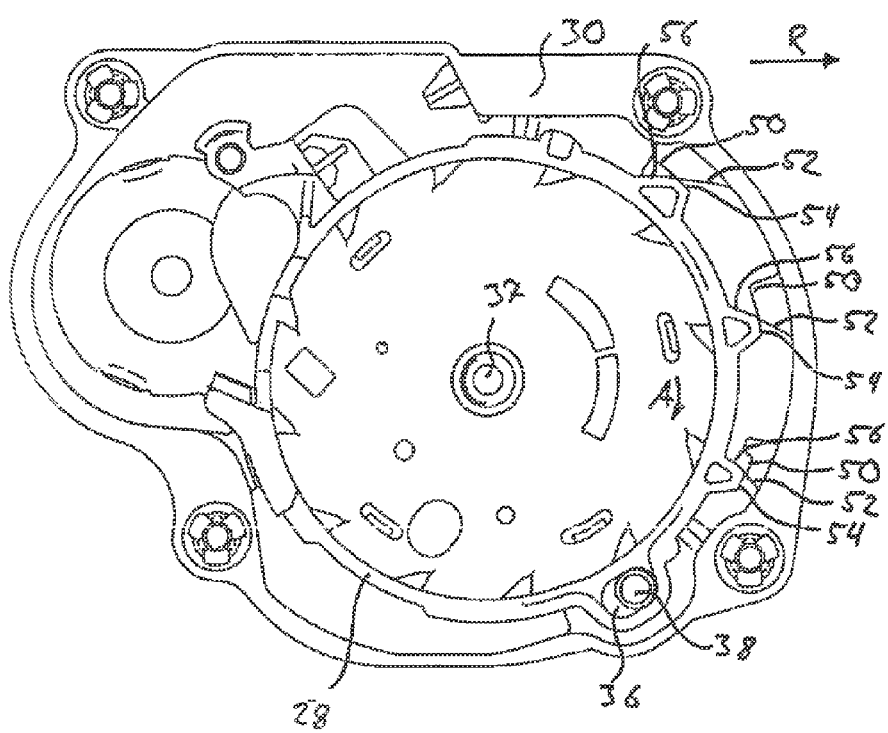

When the belt reel 14 is locked on the control lever 28 in a vehicle-sensitive manner by the intermediate lever 40 or in a webbing-sensitive manner by the control pawl 34, the belt reel 14 is rotated by the tension on the webbing in the unwinding direction A, wherein also the control lever 28 coupled to the belt reel 14 is rotated (FIGS. 6*a* and 6*b*). This limited rotation of the control lever 28 is enabled by the slotted hole 36 and the pivot pin 38, resp., i.e. that the control lever 28 with the slotted hole 36 is displaced relative to the pivot pin 38. When the control lever 28 is pivoted so far that the slotted hole 36 abuts against the pivot pin 38, at the same time the control lever 28 is provided in a release position in which the contact faces 50, 54 are not adjacent to each other (FIGS. 6*a* and 6*b*).

Figure 7A:
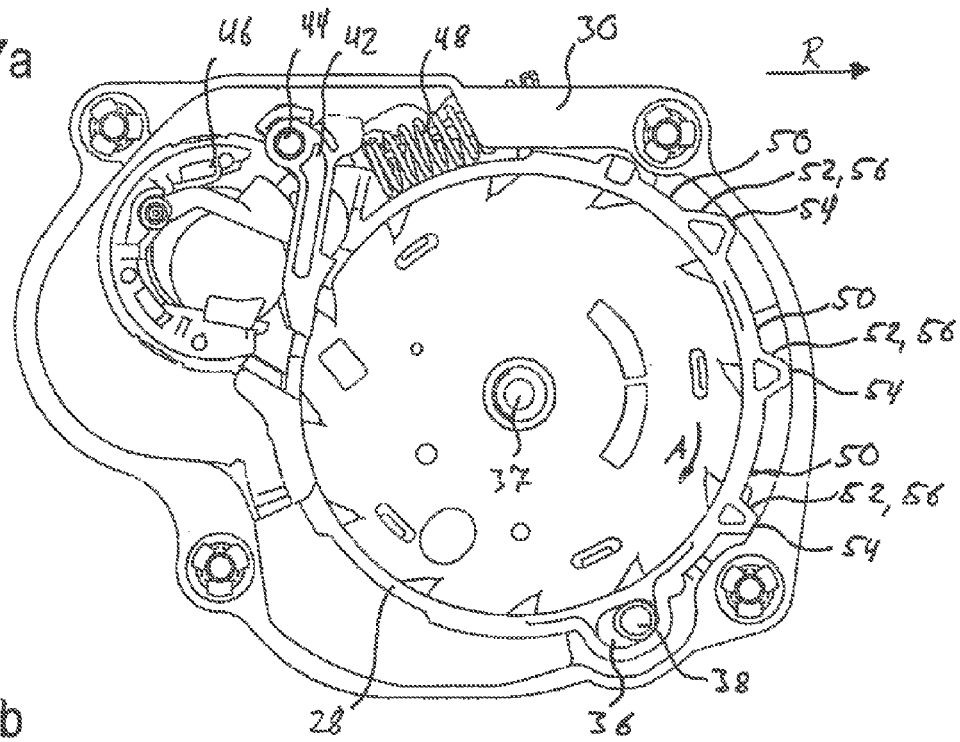
FIGS. 7a and 7b show the same views as in FIGS. 5e and 5b, wherein the control lever is provided in the locking position.
Figure 7B:
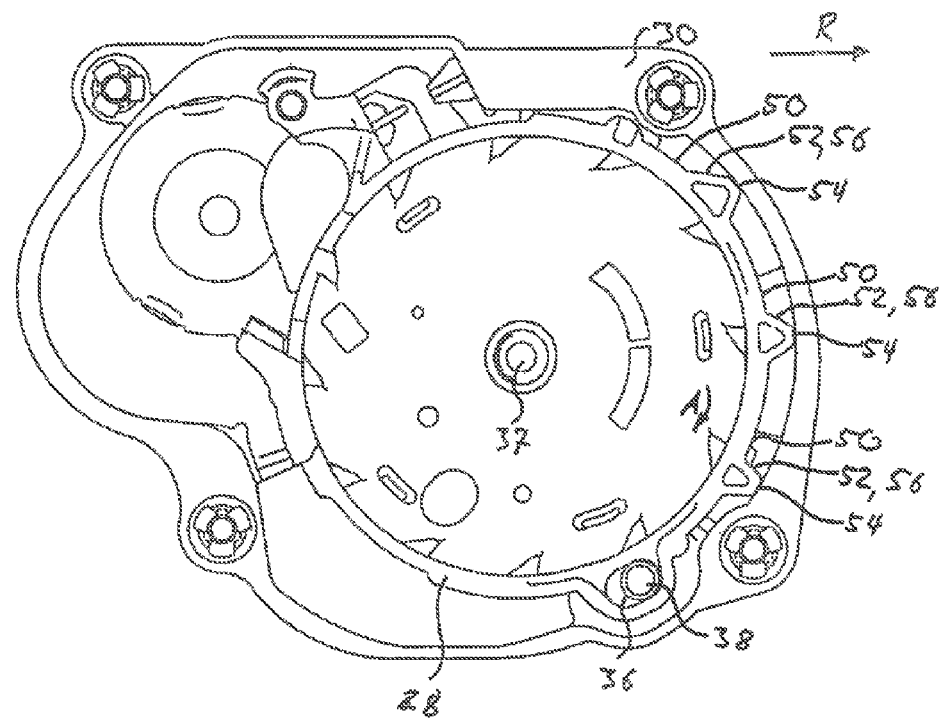

Subsequently, as the supporting faces 50, 54 are no longer adjacent to each other, the control lever 28 can be pivoted about the pivot pin 38 so that the belt reel 14 and the locking tooth system 28, resp., can engage in the locking teeth 24 of the frame 12 (FIGS. 7*a* and 7*b*).

During this movement the sliding faces 52, 56 are adjacent to each other so that a controlled movement or a controlled pivoting about the pivot pin 38 takes place. The sliding faces 52, 56 can equally be configured so that they actively support further rotation or pivoting of the control lever 28 into the locking position in the case of tensile force acting in the take-off direction R.

The interlock mechanism formed by the supporting faces 50 and 54, resp., thus prevents the control lever 28 from being displaced from the home position (FIGS. 5*a* and 5*b*) directly into the locking position (FIGS. 7*a* and 7*b*). For this purpose, first a rotation in the take-off direction A is required which is possible only after coupling the belt reel 14 to the control lever 28 and is triggered by the tension acting on the webbing.

The fact that the control lever 28 first has to be rotated and then has to be pivoted about the pivot pin 38 reliably prevents the control lever 28 and the belt reel 14 from being shifted into the locking position in a pre-locked state by deceleration or acceleration without activation of the vehicle-sensitive or the webbing-sensitive locking mechanism.

As afore-explained, each of the vehicle-sensitive and the webbing-sensitive locking mechanisms interact with the belt reel 14 so that during locking of the belt reel on the control lever the locking tooth system 26 of the belt reel 14 is orientated so that the locking tooth system 26 is guided in the correct position into the locking teeth of the frame. Thus, a movement into the locking position in which the teeth are abutting each other and thus the locking tooth system 26 cannot engage in the locking teeth 24 is safely excluded.

As soon as the tensile force acting on the webbing decreases, the control lever 28 is pivoted by the spring 48 back into the release position and subsequently is rotated back into the home position.

The interlock mechanism also can include merely frame-side or only control lever-side supporting faces 50, 54. It has merely to be ensured that displacement or pivoting into the locking position is not possible before the control lever 28 has been rotated into the release position. It is also imaginable that the supporting faces 50, 54 Include no sliding faces. The latter merely serve for guiding the control lever 28 in addition to the bearing formed by the slotted hole 36 and the pivot pin 38.

The invention claimed is:

1. A belt retractor (10) for a vehicle seat belt comprising a frame (12) provided with plural locking teeth (24), a belt reel (14) which is rotatably supported in the frame (12) and includes a locking tooth system (26) corresponding to the locking teeth (24), and comprising a looking mechanism adapted to transfer the belt reel (14) from a home position in which it is freely rotatable into a locking position in which the locking tooth system (26) of the belt reel (14) engages in the locking teeth (24) of the frame (12) wherein at least on pivoting control lever (28) is provided in which one side of the belt reel (14) is rotatably supported and which is adapted to guide the belt reel (14) from the home position into the locking position, wherein an interlock mechanism is provided for releasing a pivoting movement of the control lever (28) about a first axis not before the control lever has been rotated around a second axis in the unwinding direction (A) of the webbing from a home position into a release position, the first axis being spaced from the second axis.

2. The belt reactor according to claim 1, wherein the interlock mechanism includes frame-side supporting faces (50).

3. The belt retractor according to claim 2, wherein the frame-side supporting faces (50) are arranged at an angular distance from each other.

4. The belt retractor according to claim 2, wherein the supporting faces (50, 54) have sliding faces (52, 56) extending inclined with respect to the circumferential direction.

5. The belt retractor according to claim 1, wherein the interlock mechanism includes supporting faces (54) on the control lever.

6. The belt retractor according to claim 5, wherein the control lever-side supporting faces (54) are arranged at an angular distance from each other.

7. The belt retractor according to claim 1, wherein the control lever (28) is arranged on the frame by means of a bearing.

8. The belt retractor according to claim 7, wherein the bearing consists of a slotted hole (36) and a pivot pin (38) engaging in said slotted hole (36).

9. The belt retractor according to claim 8, wherein the pivot pin (38) is provided at bearing shell (30) arranged on the frame.

10. The belt retractor according to claim 8, wherein the slotted hole (36) is provided at the control lever (28).

11. A belt retractor for a seat belt comprising:
a frame having locking teeth;
a belt reel rotatably supported in the frame and having a locking tooth system, the belt reel having a home position wherein rotation of the belt reel relative to the frame is permitted and a locking position wherein the locking tooth system engages the locking teeth to block rotation of the belt reel relative to the frame;
a control lever pivotable relative to the frame about a first axis to guide the belt reel between the home position and the locking position, the control lever being rotatable relative to the frame about a second axis in a webbing unwinding direction from a home position to a release position, the second axis being spaced from the first axis;
a locking mechanism for coupling the control lever for rotation with the belt reel relative to the frame, the control lever rotating from the home position to the release position relative to the frame when the control lever is coupled to the belt reel by the looking mechanism; and
an interlock mechanism, the interlock mechanism blocking pivoting of the control lever relative to the frame until the control lever rotates from the home position to the release position.

* * * * *

UNITED STATES PATENT AND TRADEMARK OFFICE
CERTIFICATE OF CORRECTION

PATENT NO. : 9,919,676 B2
APPLICATION NO. : 14/773414
DATED : March 20, 2018
INVENTOR(S) : Thomas Kielwein et al.

Page 1 of 1

It is certified that error appears in the above-identified patent and that said Letters Patent is hereby corrected as shown below:

In the Specification

Column 6, Line 28 reads "looking" should read --locking--

Column 6, Line 32 reads "on" should read --one--

Column 6, Line 42 reads "reactor" should read --retractor--

Column 6, Line 64 reads "at bearing" should read --at a bearing--

Column 7, Line 20 reads "looking" should read --locking--

Signed and Sealed this
Twelfth Day of June, 2018

Andrei Iancu
*Director of the United States Patent and Trademark Office*